United States Patent Office 2,749,288
Patented June 5, 1956

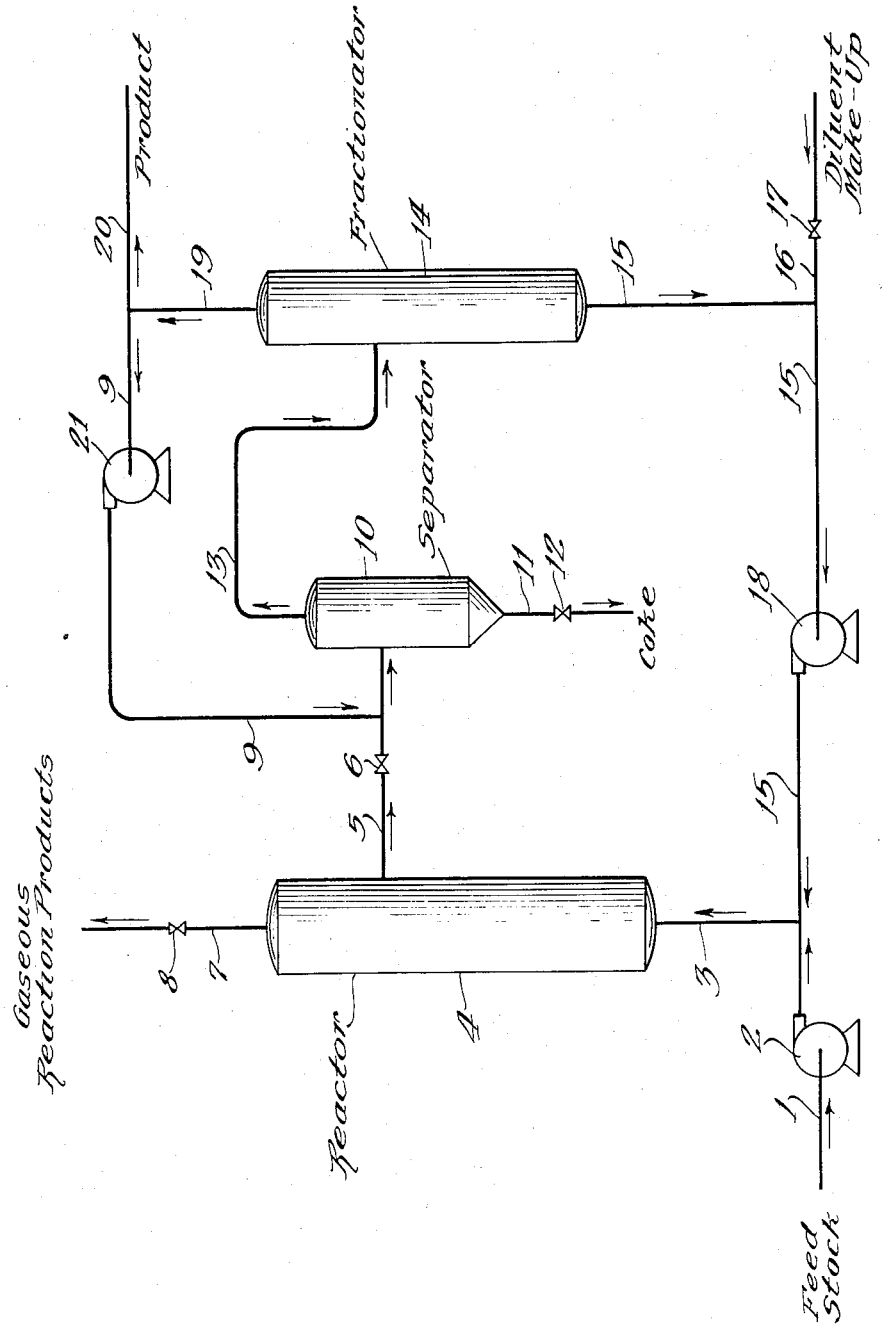

2,749,288

METHOD OF PROCESSING HYDROCARBONS WITH A MOLTEN MEDIUM

Charles H. Watkins, Western Springs, Ill., assignor to Universal Oil Products Company, Chicago, Ill., a corporation of Delaware Application July 24, 1952, Serial No. 300,611

5 Claims. (Cl. 196—52)

This process relates to an improved method of converting hydrocarbons to more desirable forms using a molten medium. In particular, this process relates to a method of eliminating coke problems in cracking processes wherein the catalyst is a molten salt.

Molten media are frequently used in processing hydrocarbons. In general, molten salts are used as catalysts for cracking hydrocarbons, however, they are frequently employed in other processes which include for example: (1) Processes known as reforming, isoforming, retreating etc.; (2) polymerization of low boiling hydrocarbons to form higher boiling hydrocarbons; (3) alkyl transfer reactions as for example, the reaction of benzene and ethyl benzene to form toluene; (4) treating of hydrocarbon fractions to remove impurities as for example desulfurization of gasoline. These catalysts have also proved effective in reactions of organic compounds such as dehydration of alcohols, synthesis of esters, alcohols, and acids etc.

When molten salts catalysts are used in cracking processes one of the difficulties encountered arises from the formation of coke, which is characteristic of cracking reactions. Coke formation in a molten salt catalyst does not present the problem to the degree that is encountered in cracking operations employing solid granular catalysts. When solid granular catalysts are used, coke is formed by the adsorption and subsequent dehydrogenation and polymerization of hydrocarbons on the surface of the catalytic material. In order for a solid granular catalyst to remain active it must be periodically regenerated by subjecting the catalyst to contact with a free-oxygen containing gas which causes the coke formation to burn off of the surface of the catalyst. Since there are no sharply defined surfaces in molten salts, the coke formation is a suspension in the molten salt which is washed out with the stream of hydrocarbon passing therethrough. It therefore can be seen that in a molten salt system, there will always be an equilibrium quantity of coke present for any given set of reaction conditions. It is frequently desirable to keep the coke in the molten system at a minimum or to eliminate it completely in order to maintain high catalytic activity and to eliminate solid material from the melt. Molten salt systems may have regenerator type vessels wherein the molten salt circulates from a reaction zone to a regeneration zone in which the molten salt is contacted with free-oxygen containing gas which burns the carbonaceous material from the melt thereby returning a pure salt to the reaction zone. This method is especially useful if the reaction is endothermic. The present invention relates to another method of removing coke from a molten salt system which requires no additional vessels or regeneration gases.

It is an object of this invention to maintain coke formations in molten salt systems in solution or suspension by the addition of a dissolving or peptizing diluent to the charge stock.

It is a particular object of this invention to circulate highly refractory compounds, that have a strong solvent effect on asphaltic carbonaceous material, through a molten salt system thereby keeping the asphaltic, carbonaceous materials, formed in the reaction, in solution or suspension so that said carbonaceous material will be removed from the reaction zone in the stream of reactants and reaction products flowing therethrough. The carbonaceous material thus removed is separated from the reaction product stream in a separate vessel remote from the reaction zone. This separation may, for example, be effected by cooling and diluting the reaction product stream with a naphtha which will cause the carbonaceous material to precipitate from the refractory solvent.

The cracking reaction will generally be effected at a temperature of from about 500° F. to about 1500° F. or more and a pressure of from atmospheric to about 2000 p. s. i. or more in the presence of a molten salt catalyst such as the halides of lithium, potassium, zinc, silver, cadmium and others and mixtures thereof or other salts such as metal sulfides, sulfates etc.

The process of this invention can best be described with reference to the accompanying drawing which is a diagrammatic flow scheme of one embodiment of the process.

The charge stock enters the plant through line 1 and pump 2 and is commingled with the diluent stream from line 15. The combined stream passes through line 3 and enters the reactor 4 wherein the reactions are effected. The liquid products pass from reactor 4 through line 5 and control valve 6 wherein they are commingled with a stream of naphtha from line 9. The stream containing reaction products, naphtha, and diluent enters separator 10 wherein the coke formed in the reaction is precipitated from the mixture as a result of the naphtha dilution. Line 11 and valve 12 are provided for the removal of coke from separation zone 10. Line 13 passes from the upper section of separator 10 and carries the reaction products and diluent stream to fractionator 14 wherein the reaction product is separated from the diluent. The diluent passes from the lower section of the fractionator through the before mentioned line 15 and pump 18 to be commingled again with the incoming charge stock. The reaction products pass from fractionator 14 through line 19 and the stream in line 19 is split, a portion passing through line 20 as final product and a second portion passing through line 9 and pump 21 to be commingled with the reactor effluent stream.

With the flow scheme as represented in the drawing the inventory of diluent in the plant is constant. However, as is common in processes of this type, there will be a small loss of diluent through fractionation, cracking, etc., and therefore, line 16 and control valve 17 are provided to make up the inventory. Reactor 4 is provided with vent line 7 and control valve 8 for venting the gaseous reaction products from the reaction zone and maintaining the desired pressure therein.

Although the drawing herein above described represents one embodiment of the present invention many modifications of this flow system can be made without removing the process from the broad scope of this invention. Some of the modifications which may be made include: 1. Recycle of the gaseous reaction product stream to commingle with the incoming charge stock thereby supplying hydrogen, one of the components of said gaseous stream, to the reaction zone to saturate olefinic compounds formed in the reaction. 2. Heat exchange flows between the reactor effluent stream and the incoming charge stream. 3. Alternate methods of precipitating the coke from the solvent such as fractionation, cooling, etc., and many others.

The preferred diluent materials of this invention are condensed ring aromatics such as phenanthrene, anthracene, pyrene, and other corresponding compounds. Any material may be used as a diluent if it has the characteristics of having a high solvent action for asphaltic or carbonaceous materials, being highly refractory so that it passes through the reaction zone unchanged, and is of such a nature as to be easily separated from the dissolved carbonaceous material and the reaction products.

I claim as my invention:

1. In the process of converting hydrocarbons by contacting said hydrocarbons with a molten salt at conversion conditions, the improvement which comprises introducing into the reaction zone a sufficient amount of a polynuclear aromatic compound to dissolve asphaltic carbonaceous materials formed at said conversion conditions.

2. The improvement of claim 1 further characterized in that said aromatic compound is phenanthrene.

3. The improvement of claim 1 further characterized in that said aromatic compound is anthracene.

4. The improvement of claim 1 further characterized in that said aromatic compound is pyrene.

5. In the process of cracking a high boiling hydrocarbon to a lower boiling hydrocarbon by contacting said high boiling hydrocarbon with a molten salt catalyst at a temperature of from about 500° F. to about 1500° F. and a pressure of from atmospheric to about 2000 p. s. i., the improvement which comprises introducing into the reaction zone with said high boiling hydrocarbon a sufficient amount of a condensed ring aromatic compound to dissolve asphaltic material formed by the cracking, passing the combined stream of reaction products and said aromatic compound from the reaction zone to a separating zone, introducing a naphtha stream into the latter zone and commingling it with said combined stream and effecting the precipitation of solid carbonaceous material, discharging the resulting precipitated solid carbonaceous material from the lower portion of said separating zone, passing a liquid stream from the upper portion of said separating zone, fractionally distilling a product-containing fraction from said liquid stream, passing at least a portion of said product-containing fraction into said separating zone while passing another portion thereof to storage, separating the condensed ring aromatic compound from said liquid stream and recycling the same to said reaction zone.

References Cited in the file of this patent
UNITED STATES PATENTS

| | | |
|---|---|---|
| 1,620,075 | Clancy | Mar. 8, 1927 |
| 2,177,421 | Stratford | Oct. 24, 1939 |
| 2,245,157 | Pier et al. | June 10, 1941 |
| 2,340,960 | Hemminger | Feb. 8, 1944 |
| 2,360,700 | McAllister et al. | Oct. 17, 1944 |
| 2,436,257 | Hansford et al. | Feb. 17, 1948 |